US011318858B2

(12) United States Patent
Zheng et al.

(10) Patent No.: US 11,318,858 B2
(45) Date of Patent: May 3, 2022

(54) INTELLIGENT ELECTRIC-VEHICLE CHARGING STATION (71) Applicants: HANGZHOU POWER SUPPLY COMPANY OF STATE GRID ZHEJIANG ELECTRIC POWER, Zhejiang (CN); ZHEJIANG DAYOU INDUSTRIAL CO., LTD. HANGZHOU SCIENCE TECH. DEVLMT BRANCH CO., Zhejiang (CN)

(72) Inventors: Zhengxian Zheng, Zhejiang (CN); Chunlin He, Zhejiang (CN); Weifu Wang, Zhejiang (CN); Jun Zhu, Zhejiang (CN); Peijun Chen, Zhejiang (CN); Yan Li, Zhejiang (CN)

(73) Assignees: HANGZHOU POWER SUPPLY COMPANY OF STATE GRID ZHEJIANG ELECTRIC POWER, Zhejiang (CN); ZHEJIANG DAYOU INDUSTRIAL CO., LTD., Zhejiang (CN); HANGZHOU SCIENCE TECHNOLOGY DEVELOPMENT BRANCH COMPANY, Zhejiang (CN)

( * ) Notice: Subject to any disclaimer, the term of this patent is extended or adjusted under 35 U.S.C. 154(b) by 0 days.

(21) Appl. No.: 16/755,675

(22) PCT Filed: Oct. 12, 2019

(86) PCT No.: PCT/CN2019/110886
§ 371 (c)(1),
(2) Date: Apr. 13, 2020

(87) PCT Pub. No.: WO2020/078289
PCT Pub. Date: Apr. 23, 2020

(65) Prior Publication Data
US 2021/0237610 A1 Aug. 5, 2021

(30) Foreign Application Priority Data

Oct. 17, 2018 (CN) .......................... 201811209114.1

(51) Int. Cl.
H02J 7/00 (2006.01)
B60L 53/67 (2019.01)
(Continued)

(52) U.S. Cl.
CPC ............... B60L 53/67 (2019.02); B60L 53/62 (2019.02); B60L 58/12 (2019.02); H02J 7/0031 (2013.01);
(Continued)

(58) Field of Classification Search
USPC .................................................. 320/109.137
See application file for complete search history.

(56) References Cited

U.S. PATENT DOCUMENTS

2012/0091960 A1* 4/2012 Khattab ................ B60L 3/0069
320/109
2013/0057210 A1* 3/2013 Nergaard ................ B60L 53/65
320/109
(Continued)

FOREIGN PATENT DOCUMENTS

CN 103023105 A 4/2013
CN 202948322 * 5/2013
(Continued)

OTHER PUBLICATIONS

International Search Report from corresponding case PCT/CN2019/110886 dated Jan. 10, 2020 (in Chinese only).

Primary Examiner — Samuel Berhanu
(74) Attorney, Agent, or Firm — Burns & Levinson, LLP; Joseph M. Maraia (57) ABSTRACT An intelligent electric-vehicle charging station is provided. The charging station includes at least one charger. Each
(Continued)

charger includes at least one power conversion unit and at least one charging terminal. Each power conversion unit includes an alternating-current power distribution module, a plurality of rectification modules, a switch matrix and a power controller. The alternating-current power distribution module supplies power to each power conversion unit and the at least one charging terminal. The rectification modules are divided into a plurality of groups of modules. The plurality of groups of modules is controlled, through the switch matrix, to be connected to a plurality of direct-current output circuits. Each direct-current output circuit is connected to one charging terminal. The switch matrix switches each group of modules in the plurality of direct-current output circuits according to a control instruction of the power controller.

9 Claims, 4 Drawing Sheets

(51) Int. Cl.
   *B60L 53/62* (2019.01)
   *B60L 58/12* (2019.01)
(52) U.S. Cl.
   CPC .... *H02J 7/00309* (2020.01); *H02J 7/007192* (2020.01); *B60L 2270/32* (2013.01); *H02J 2310/48* (2020.01)

(56) References Cited

U.S. PATENT DOCUMENTS

| | | | |
|---|---|---|---|
| 2013/0069592 A1* | 3/2013 | Bouman | H02J 7/007 320/109 |
| 2014/0254050 A1* | 9/2014 | Haines | H02H 3/16 361/42 |
| 2014/0320083 A1* | 10/2014 | Masuda | H01M 10/44 320/109 |
| 2015/0165917 A1* | 6/2015 | Robers | B60L 53/68 320/109 |

FOREIGN PATENT DOCUMENTS

| | | |
|---|---|---|
| CN | 104539030 A | 4/2015 |
| CN | 105024411 A | 11/2015 |
| CN | 206226069 U | 6/2017 |
| CN | 106945539 A | 7/2017 |
| CN | 207207770 U | 4/2018 |
| CN | 108162790 A | 6/2018 |
| CN | 108215902 A | 6/2018 |
| CN | 207683356 U | 8/2018 |
| CN | 108631408 A | 10/2018 |
| CN | 108649634 A | 10/2018 |
| CN | 109455106 A | 3/2019 |
| JP | 20130939 A | 5/2013 |
| JP | 2015208065 A | 11/2015 |

* cited by examiner

INTELLIGENT ELECTRIC-VEHICLE CHARGING STATION

CROSS REFERENCE TO RELATED APPLICATIONS

This application is a national stage application under 35 U.S.C. 371 based on international patent application PCT/CN2019/110886 filed on Oct. 12, 2019 which claims priority to Chinese patent application No. 201811209114.1 filed with the CNIPA on Oct. 17, 2018, disclosures of both of which are incorporated herein by reference in their entireties.

TECHNICAL FIELD

The present application relates to the electric power engineering technology, for example, an intelligent electric-vehicle charging station.

BACKGROUND

With the rapid development of electric vehicles, the number of people who use electric vehicles is growing year by year and the charging demand of users is urgent. However, when the original distribution substations are designed and planned, charging facilities of electric vehicles are not incorporated into the capacity of distribution substations. The capacity of distribution substations in the related art cannot meet the fast-growing charging demand of charging facilities of electric vehicles. In addition, it is difficult to acquire land for construction of charging facilities at present. Thus, it is necessary to construct electric-vehicle charging stations based on integration of power transformation, distribution and charging in comprehensive view of regional power distribution capacity and charging requirements.

The charging strategies of conventional intelligent electric-vehicle charging stations are relatively single and cannot meet charging requirements in different situations. In addition, a charger usually cannot effectively guard against situations doing harm to charging safety during charging.

SUMMARY

The present application provides an intelligent electric-vehicle charging station in comprehensive view of regional power distribution and charging power capacity, capable of charging using a plurality of strategies, applicable to charging requirements in different situations and capable of active safety protection by a charger during charging. The present application adopts the following technical solution: an intelligent electric-vehicle charging station. The charging station includes at least one charger. Each charger includes at least one power conversion unit and at least one charging terminal. Each power conversion unit includes an alternating-current power distribution module, a plurality of rectification modules, a switch matrix and a power controller. The alternating-current power distribution module is configured to supply power to a respective power conversion unit and the at least one charging terminal. The rectification modules are divided into a plurality of groups of modules. The plurality of groups of module assemblies is controlled, through the switch matrix, to be connected to a plurality of direct-current output circuits. Each direct-current output circuit is connected to one charging terminal. The switch matrix switches each group of module assemblies in the plurality of direct-current output circuits according to a control instruction of the power controller.

DETAILED DESCRIPTION

Figure 1:
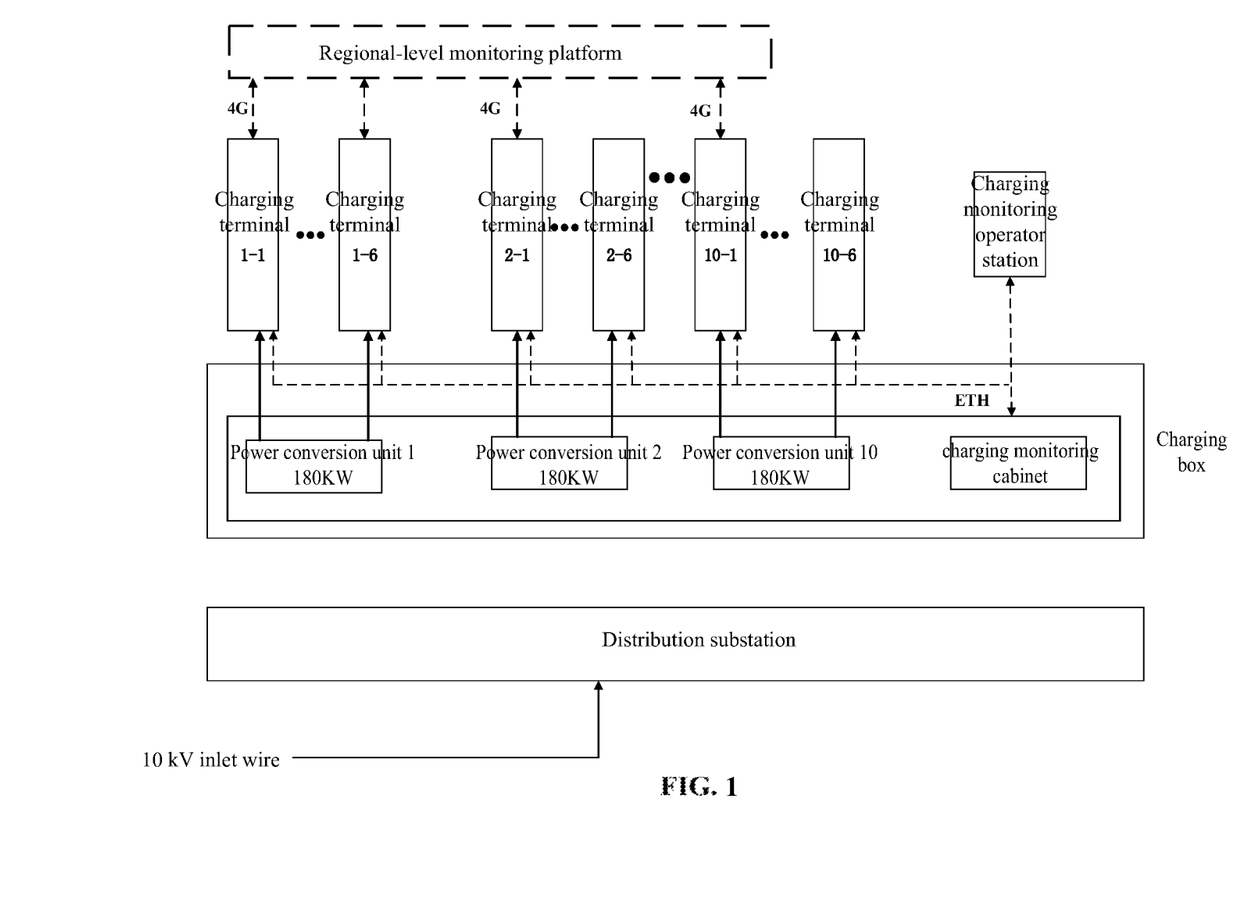
FIG. 1 is a block diagram of system configuration according to an embodiment of the present application.

Referring to FIG. 1, the substation adopts a 10 kV three-winding transformer, where the high-voltage side is connected to a 10 kV power grid and supplies power to the regional load, and the low-voltage side 0.4 kV is connected to an intelligent electric-vehicle charging station, serves electric-vehicle charging equipment directly and supplies power to a residential quarter. The intelligent electric-vehicle charging station includes at least one charger. Each charger includes at least one charging power conversion unit and at least one charging terminal. Each power conversion unit is connected to six charging terminals. The charging box is disposed outdoors. The at least one power conversion unit is centrally disposed in the charging box. The charging terminal is disposed at one end of the parking space. The charging terminal adopts a single-gun design and is provided with a human-computer interaction interface and a charging gun. Moreover, charging, transaction and state information can be uploaded to a regional monitoring platform through a 4G communication module inside a charging terminal. Furthermore, a charging monitoring system may be provided. A 20 A power supply is used as a charging monitoring power supply. Each substation may be provided with a station-level monitoring system. The station-level monitoring system can upload charging, transaction and state information to a regional-level monitoring platform. The station-level monitoring system includes a charging monitoring cabinet and a charging monitoring operator station. The charging monitoring cabinet is disposed in the charging box.

Figure 2:
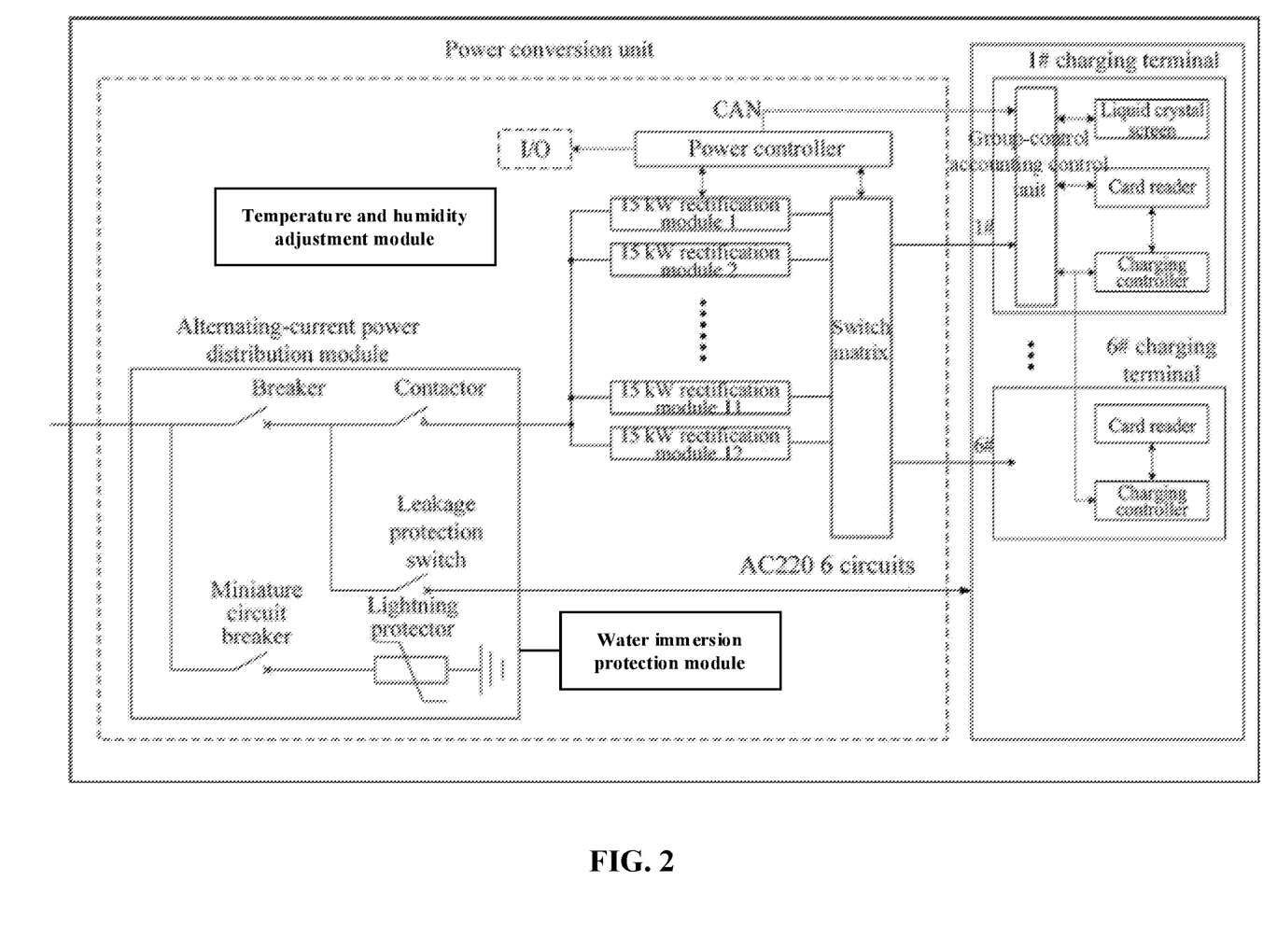
FIG. 2 is a block diagram of an electrical principle of a charger according to an embodiment of the present application.

Referring to FIG. 2, the charger includes one power conversion unit and six charging terminals, where the power conversion unit includes an alternating-current power distribution module, 12 rectification modules, a switch matrix and a power controller.

The alternating-current power distribution module is connected to a 380 V power supply. The wire inlet side includes a breaker, a contactor and a lightning protector. The output feed terminal is provided with a leakage protection switch. The breaker is configured to provide overload and short-circuit protection. The contactor is configured to connect or disconnect a alternating-current main loop or a control loop circuit of the load. The lightning protector is configured to suppress a lightning surge and protect the charger. A leakage protection switch is disposed at an output feed terminal and a direct-current fast-acting fuse is disposed at a charging connection output terminal to provide overload and short-circuit protection. The alternating-current power distribution module is configured to supply power to the rectification modules and at least one charging terminal. Exemplarily, the alternating-current power distribution module supplies power to the twelve rectification modules and provides six AC 220 V output for supplying power to the six charging terminals respectively.

The twelve rectification modules are divided into nine groups of modules. The switch matrix switches the output of each group of modules in six direct-current output circuits according to the control instruction of the power controller. Direct-current output circuits one to six are connected to corresponding six charging terminals. Rectification modules adopt constant-power and wide-voltage output and, optionally, adopt an output voltage range of DC 200 V to DC 750 V, a rated power of 15 kW and a constant power section of DC 330 V to DC 500 V and DC 500 V to DC 750 V. Among the twelve rectification modules, six 15 kW rectification modules each constitute one group of module assembly and the six 15 kW rectification modules constitute six groups of 15 kW module assemblies; each two of the other six 15 kW rectification modules constitute one group of module assembly and the other six 15 kW rectification modules constitute three groups of 30 kW module assemblies. Module assemblies one to six are connected to direct-current output circuits one to six respectively. Each of module groups one to six has an output power of 15 kW. Each of module assemblies seven to nine has an output power of 30 kW. Each of module groups one to nine can be switched in direct-current output circuits one to six through the switch matrix.

Figure 3:
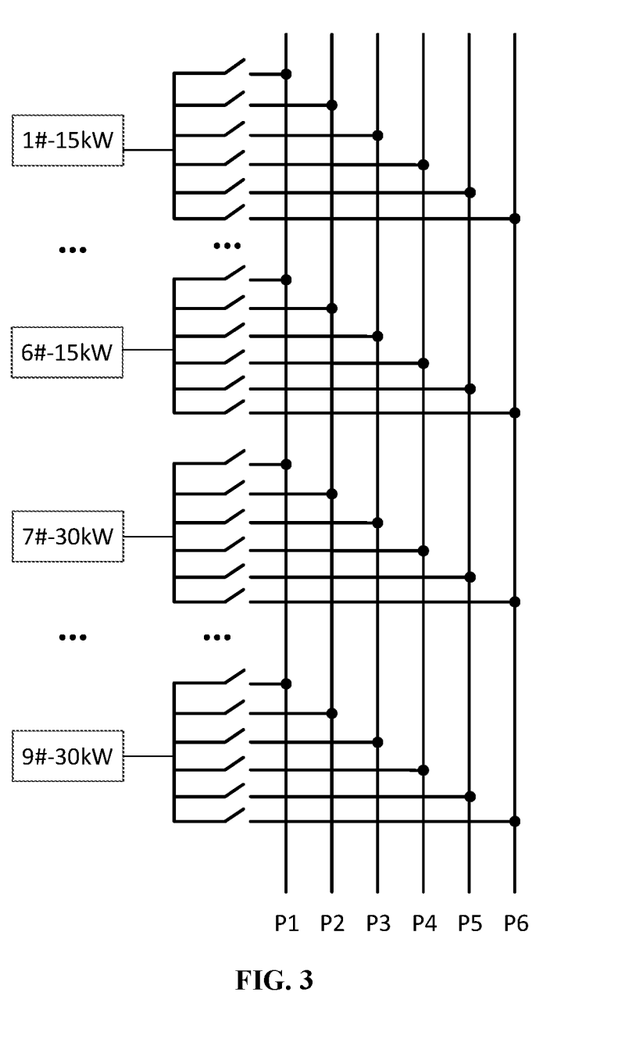
FIG. 3 is a block diagram of an electrical principle of a switch matrix according to an embodiment of the present application.

Referring to FIG. 3, the switch matrix adopts a high-voltage direct-current contactor, and the output of each group of module assemblies is switched at six charging connection output terminals according to the control instruction of the power controller so that dynamic allocation is achieved.

The power controller communicates with the charging terminal, the rectification module and the switch matrix, and delivers a charging power allocation and load adjustment instruction according to vehicle charging demands and in accordance with predetermined charging strategies.

The charging strategies of the charger are described below.

Full-power orderly charging: each power conversion unit is configured to output constant power to each charging terminal. Each charging terminal corresponds to one vehicle. The current charging terminal charges the current vehicle. For example, one charging terminal outputs a charging power of 180 kW to achieve high-current fast charging. A charging terminal other than the current charging terminal does not charge a vehicle other than the current vehicle before charging of the current vehicle is finished. During charging, in a case where charging power allocated by the power controller to the current vehicle includes redundant power and the redundant power is an integer multiple of power of one rectification module, rectification modules having the redundant integer multiple of power are cut off one by one and the cut rectification modules enter a sequence of charging modules having idle power.

Average-power charging: each power conversion unit is configured to output equal charging power to multiple charging terminals. Each charging terminal corresponds to one vehicle. The multiple charging terminals simultaneously charge vehicles corresponding to the multiple charging terminals. For example, each of the six charging terminals outputs a charging power of 30 kW, and the six charging terminals charge six vehicles simultaneously.

Free dynamic-power charging: after a to-be-charged vehicle enters a charging sequence, in a case where idle power of a power conversion unit is greater than or equal to required charging power of the to-be-charged vehicle, idle power matching the required charging power of the to-be-charged vehicle is outputted to charge the to-be-charged vehicle; in a case where the idle power of the power conversion unit is less than the required charging power of the to-be-charged vehicle, all of the idle power of the power conversion unit is outputted to charge the to-be-charged vehicle; after the to-be-charged vehicle enters the charging sequence, in a case where the power conversion unit has no idle power, a corresponding module assembly of a charging terminal corresponding to the to-be-charged vehicle is used to charge the to-be-charged vehicle; and during charging, in a case where charging power allocated to the to-be-charged vehicle includes redundant power and the redundant power is an integer multiple of power of one rectification module, rectification modules having the redundant integer multiple of power are cut off one by one, the cut rectification modules enter a sequence of charging modules having idle power, and cut redundant power units are allocated, according to a first-in first-out principle, to charging terminals that need to charge vehicles and exclude charging terminals of the cut redundant power modules have been cut and that need to charge vehicles so as to charge vehicles that need to be charged.

The power conversion unit is provided with an input overvoltage or undervoltage protection module, and the input overvoltage or undervoltage protection module controls the rectification modules to shut down and raise an alarm in a case of an input overvoltage or undervoltage protection action.

The power conversion unit is provided with an output overvoltage or overcurrent protection module, and the output overvoltage or overcurrent protection module controls the rectification modules to shut down and raise an alarm in a case of an output overvoltage or overcurrent protection action.

The output terminal of the power conversion unit is provided with an isolation diode for preventing the current of a power storage battery from flowing backwards to the power conversion unit.

The power conversion unit is provided with an over-temperature protection module. The over-temperature protection module is configured such that the power conversion unit outputs lower power in a case where the temperature inside the power conversion unit exceeds a preset temperature and configured such that the rectification module shuts down and raises an alarm in a case where an over-temperature protection action occurs. The condition under which the over-temperature protection action occurs is that the temperature inside the power conversion unit exceeds the limit temperature threshold.

The charger has an output-current surge limiting capability when the rectification module outputs a current in the process in which the charger allocates power dynamically. The output-current surge limiting capability is the maximum threshold limiting the surge current from the charger to the vehicle or the maximum threshold limiting the backward surge current from the vehicle to the charger. The process in which the charger stops charging has the function of bleeding a residual voltage.

The power conversion unit further includes a temperature and humidity adjustment module. The temperature and humidity adjustment module is configured to monitor temperature and humidity in the cabinet of the power conversion unit and automatically adjust the temperature and the humidity in the cabinet of the power conversion unit such that the temperature and the humidity in the cabinet of the power conversion unit are within a set range.

The power conversion unit further includes a water immersion protection module. The water immersion protection module is configured to automatically disconnect an alternating-current input power supply and raise an alarm in a case where a water level in the cabinet of the power conversion unit reaches a preset height.

The charger has a cabinet door opening protection function. The charger automatically cuts off the alternating-current input power and raises an alarm in a case where the cabinet door of the charger is open.

The cabinet of the power conversion unit has a dustproof function. A filter screen and an electrostatic adsorption device are disposed at the inlet and outlet of ventilation and heat dissipation. The filter screen is dismountable for maintenance and cleaning.

The charging terminal includes a group-control accounting control unit, a liquid crystal screen, a card reader and a charging controller. The group-control accounting control unit is configured to send the state of the charger and the alarm information to the station-level monitoring system or the regional-level monitoring system. The group-control accounting control unit is configured to charge a fee from the charging terminal and other charging terminals belonging to the same charger as the charging terminal. The group-control accounting control unit is controlled by a computer, communicates with the power controller and the charging terminal through one controller area network (CAN) port, and collects state information of the power conversion unit, charging information and vehicle battery information. Exemplarily, the state information of the power conversion unit includes the standby state, charging state, alarm state and the like of the power conversion unit; the charging information includes the charging voltage, charging current, charging power and the like in the current charging process; the vehicle battery information includes the current battery state of charge, the current battery-end voltage, the maximum and lowest voltage of a single power storage battery, the maximum and minimum temperature of the power storage battery, and the like. The group-control accounting control unit communicates with the charging terminal through one CAN port, delivers a charging start command, collects charging transaction power information and executes a cluster load regulation and control instruction.

Figure 4:
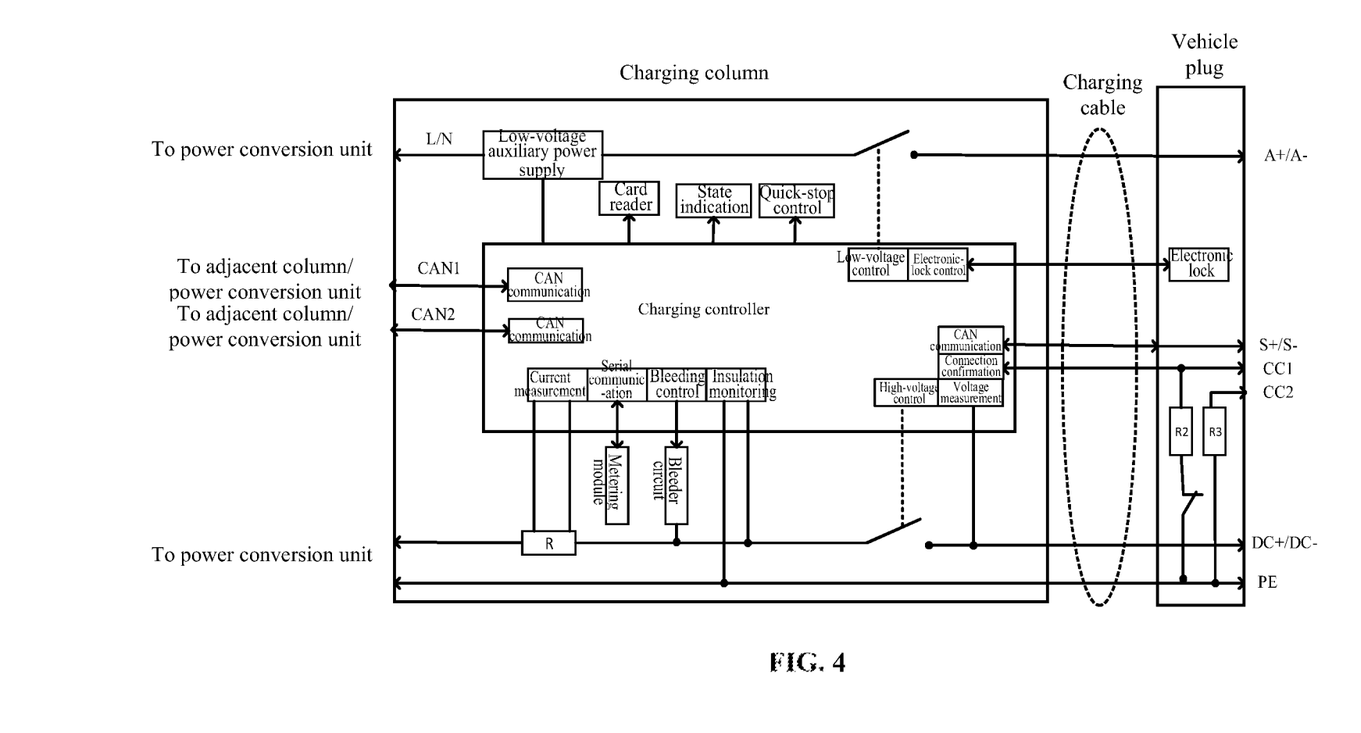
FIG. 4 is a block diagram of an electrical principle of a charging terminal according to an embodiment of the present application.

Referring to FIG. 4, the charging terminal includes a charging column connected to the power conversion unit, a charging cable connected to the charging column, and a vehicle plug connected to the charging cable. The charging column is provided with a charging controller. The charging controller is controlled by a computer and communicates with a power conversion unit and a vehicle battery management system (BMS). The charging controller is configured to confirm the connection state between a charging terminal and a vehicle, control the charging process of the vehicle, and upload information such as the vehicle connection state, the battery charging requirement, the charger state to a regional-level monitoring platform.

The charging controller is provided with an active safety protection module. The active safety protection module is configured to monitor the power storage battery of the vehicle and the charging terminal. The active safety protection module monitors the vehicle power storage battery charging parameters, vehicle charging requirement, total charging state and vehicle battery state information and makes a comprehensive judgement in conjunction with the working state information of the charging terminal. An active safety protection measure is taken in a case where the power storage battery of the vehicle and the charging terminal satisfy an active safety protection condition during charging.

The active safety protection condition is described below.

(1) The voltage of a single power storage battery is greater than the maximum allowable charging voltage threshold of the single power storage battery.

(2) The temperature of the power storage battery is greater than the maximum allowable temperature threshold of the power storage battery.

(3) The voltage output value of the charging terminal is greater than the maximum allowable charging voltage threshold of the charging terminal, the required charging voltage value of the vehicle is greater than the maximum allowable charging voltage threshold of the vehicle, or the charging voltage measurement value of the power storage battery is greater than the maximum allowable charging voltage threshold of the power storage battery.

(4) The current output value of the charging terminal is greater than the maximum allowable charging current threshold of the charging terminal, the required charging current value of the vehicle is greater than the maximum allowable charging current threshold of the vehicle, or the charging current measurement value of the power storage battery is greater than the maximum allowable charging current threshold of the power storage battery.

(5) The accumulated charging electric quantity of the charging terminal is greater than the total electric quantity indicated for the power storage battery.

(6) The absolute value of the difference between the charging voltage measurement value of the power storage battery and the voltage output value of the charging terminal is greater than a preset voltage threshold.

(7) The absolute value of the difference between the charging current measurement value of the power storage battery and the current output value of the charging terminal is greater than a preset current threshold.

(8) The current state of charge (SOC) of the power storage battery remains unchanged within 5 min, and the estimated remaining charging time remains unchanged within 5 min.

The active safety protection measure includes stopping charging within 1 s, disconnecting a high-voltage direct-current contactor and a low-voltage auxiliary power supply relay, and uploading alarm information. The high-voltage direct-current contactor is the switch of a direct-current output circuit and is disposed on a direct-current output bus. The low-voltage auxiliary power supply relay is the switch of a low-voltage auxiliary power module. The active safety protection function may be selected and configured locally or remotely.

The charging controller controls a charger to stop charging and controls the low-voltage auxiliary power supply relay and the high-voltage direct-current contactor on the direct-current output circuit bus to be disconnected within 100 ms when one of the following cases occurs during charging: a failure that the charger is incapable of continuing charging; triggering an emergency stop switch action; disconnecting a protective ground wire between the charger and the vehicle; or disconnecting a connection confirmation signal between the charger and the vehicle.

In a case where communication between the charger and the vehicle BMS times out, charging is stopped and the high-voltage direct-current contactor on the direct-current output bus is disconnected within 10 s. Later, a communication handshake is reinitiated so that charging is restarted. In a case where communication fails after reconnection is performed for three times, it is determined that a communication outage occurs, the current charging is stopped, and the low-voltage auxiliary power supply relay and the high-voltage direct-current contactor on the direct-current output bus are disconnected within 10 s.

The vehicle plug is provided with an electronic lock and a mechanical lock which are locked to a vehicle charging interface. In a case where the electronic lock is in a locked position, the mechanical lock is inoperable and the charging controller determines whether the electronic lock is reliably locked. The charger stops charging or does not start charging in a case where the electronic lock is not reliably locked. The electronic lock is automatically unlocked in a case where the charger is faulty and incapable of continuing charging.

The charger includes a vehicle and charger matching predetermination module. The vehicle and charger matching predetermination module is configured to: in a case where the charging controller in the charger detects that a vehicle-end battery voltage is normal after a vehicle-end direct-current contactor is closed in a stage where the vehicle is ready for starting charging, determine that the vehicle matches the charger and allow to start a charging process. The vehicle-end battery voltage is the voltage at the external end of the vehicle-end direct-current contactor. In a case where the error range between the vehicle-end battery voltage and the voltage of the power storage battery of the current vehicle in the communication message sent by the vehicle-mounted controller to the charging controller is less than or equal to ±5% of the vehicle-end battery voltage, it is determined that the vehicle-end battery voltage is normal.

The charger further includes a precharging control module. The precharging control module is configured to: after the charger detects the vehicle-end battery voltage and determines that the vehicle matches the charger in the stage where the vehicle is ready for starting charging, perform precharging control, adjust the output voltage of the charger such that the difference between the output voltage of the charger and a vehicle-end battery voltage measurement value is less than 10 V, close the direct-current contactor of the charger, and control a surge current, which is flowing from the vehicle to the charger or from the charger to the vehicle and is generated when the direct-current contactor of the charger is turned on, to be less than 20 A.

The charging controller is provided with a bleeding control module. The bleeding control module is communicatively connected to a bleeder circuit. The bleeder circuit is disposed at the output terminal of a rectification module. The bleeding control module is configured to: after normal charging is finished or charging is abnormally terminated and the direct-current contactor of the charger is turned off, control the bleeder circuit to bleed a residual voltage at the output terminal of the rectification module and reduce the direct-current output voltage of the rectification module to a voltage of less than 60 V within 1 s.

The charger includes a direct-current contactor state monitoring module. The direct-current contactor state monitoring module is configured to determine whether each closing and disconnection action state of the high-voltage direct-current contactor of the switch matrix is consistent with a control command of the charging controller and terminate charging in a case where each closing and disconnection action state of the high-voltage direct-current contactor of the switch matrix is inconsistent with the control command of the charging controller. The direct-current contactor state monitoring module is configured to perform a contact adhesion detection of the high-voltage direct-current contactor of the switch matrix each time the high-voltage direct-current contactor of the switch matrix is turned off and control the charger to raise an alarm and stop charging in a case where the high-voltage direct-current contactor of the switch matrix undergoes contact adhesion.

The direct-current contactor state monitoring module is further configured to determine whether each closing and disconnection action state of the direct-current contactor of the low-voltage auxiliary power module is consistent with a control command of the charging controller and terminate charging in a case where each closing and disconnection action state of the direct-current contactor of the low-voltage auxiliary power module is inconsistent with the control command of the charging controller. The direct-current contactor state monitoring module is further configured to perform a contact adhesion detection of the direct-current contactor of the low-voltage auxiliary power module each time the direct-current contactor of the low-voltage auxiliary power module is turned off and control the charger to raise an alarm and stop charging in a case where the direct-current contactor of the low-voltage auxiliary power module undergoes contact adhesion. The charging controller is further provided with an insulation monitoring module used for insulation monitoring of the direct-current output circuit and capable of cooperating with the insulation monitoring function of the vehicle. The insulation monitoring function of the charger conforms to the specifications in appendixes B.4.1 and B.4.2 of GB/T 18487.1-2015.

The charger is further provided with a low-voltage auxiliary power module. The low-voltage auxiliary power module supplies power to the vehicle battery management system during charging. Each charger is further provided with a metering module for metering the output electric energy of the charging interface. The metering module should be an intelligent direct-current electric energy meter in conformity with the specifications of GB/T 29318-2012 Electric Energy Metering for Electric Vehicle Off-Board Charger. A current circuit is connected through a shunt and integrally encapsulated with the metering module. The wiring mode and the mounting mode meet the requirement of rapid disassembling and assembling and facilitate verification for the user.

The charging controller is further provided with a charging data recording and storage module for collecting and storing the data below during charging of a connected vehicle. The charger stores at least three charging records cyclically and has a power loss protection function.

(a) The Battery Charging Parameters (BCP) message of a power storage battery in the configuration stage;

(b) The Battery Charging Lab (BCL) message of a power storage battery in the charging stage with a sampling period of less than or equal to 1 min;

(c) The Battery Charge Status (BCS) message of a power storage battery in the charging stage with a sampling period of less than or equal to 1 min;

(d) The Charger Charging Status (CCS) message of a charger in the charging stage with a sampling period of less than or equal to 1 min;

(e) The Battery Status Message (BSM) of a power storage battery in the charging stage with a sampling period of less than or equal to 1 min;

(f) The Battery Stop (BST) message of a vehicle in the charging stage;

(g) The Charger Stop (CST) message of a charger in the charging stage;

(h) The Battery Statistical Data (BSD) message of a vehicle at the charging ending stage; and (i) The Charger Statistical Data (CSD) message of a charger at the charging ending stage.

The charger has the collection, alarming and storage functions for various abnormal information in a charging control process, stores not less than 200 alarm records, and has a power loss protection function.

The charger has the function of running-state indication including "power", "charging" and "alarm" indicated by an LED light.

The charger has a humidity control module for adjusting the humidity of the charging column to prevent damage caused by condensation.

Components inside each charger are installed at a height greater than or equal to 600 mm away from the bottom so that damage caused by water invasion is prevented.

The charger has a front-opening door and thus satisfies the requirement of installation and maintenance adjacent to a wall.

The electric-vehicle charging station that integrates power transformation, distribution and charging provided in the present application can not only utilize the land resources of a distribution substation, but can also take into consideration all factors involved in the design and construction of the distribution substation, thereby facilitating optimized layout of site and space, achieving reasonable distribution of the power distribution capacity of a power grid, and ensuring orderly power supply of a residential quarter and the charging station. The charger is provided with an active safety protection module for taking active safety protection measures when an active safety protection condition is met during charging so as to ensure safe charging and prevent accidents. The charger has multiple strategies to meet charging requirements in different situations.

What is claimed is:

1. An intelligent electric-vehicle charging station, comprising at least one charger, wherein each of the at least one charger comprises at least one power conversion unit and at least one charging terminal; each of the at least one power conversion unit comprises an alternating-current power distribution module, a plurality of rectification modules, a switch matrix and a power controller, and the alternating-current power distribution module is configured to supply power to a respective power conversion unit and a respective charging terminal; and the plurality of rectification modules are divided into a plurality of groups of module assemblies, the plurality of groups of module assemblies is controlled, through the switch matrix, to be connected to a plurality of direct-current output circuits, each of the plurality of direct-current output circuits is connected to one charging terminal, and the switch matrix switches each of the plurality of groups of module assemblies in the plurality of direct-current output circuits according to a control instruction of the power controller;

wherein the power controller is configured to issue a charging power allocation and load adjustment instruction according to one of the following charging strategies:

(i) full-power orderly charging:

each of the at least one power conversion unit is configured to output constant power to each of the at least one charging terminal, wherein each of the at least one charging terminal corresponds to one vehicle, a current charging terminal is configured to charge a current vehicle corresponding to the current charging terminal, and a charging terminal other than the current charging terminal is configured to do not charge a vehicle other than the current vehicle before charging of the current vehicle is finished; and during charging, in a case where charging power allocated by the power controller to the current vehicle includes redundant power and the redundant power is an integer multiple of power of one of the plurality of rectification modules, rectification modules having the redundant integer multiple of power are cut off one by one and the cut rectification modules is configured to enter a sequence of charging modules having idle power; and (ii) average-power charging:

the at least one charging terminal comprises a plurality of charging terminals, each of the at least one power conversion unit is configured to output equal charging power to the plurality of charging terminals, each of the plurality of charging terminals corresponds to one vehicle, and the plurality of charging terminals are configured to simultaneously charge vehicles corresponding to the plurality of charging terminals; or (iii) free dynamic-power charging:

after a to-be-charged vehicle enters a charging sequence, in a case where idle power of a power conversion unit is greater than or equal to required charging power of the to-be-charged vehicle, idle power matching the required charging power of the to-be-charged vehicle is outputted to charge the to-be-charged vehicle; in a case where the idle power of the power conversion unit is less than the required charging power of the to-be-charged vehicle, all of the idle power of the power conversion unit is outputted to charge the to-be-charged vehicle;

after the to-be-charged vehicle enters the charging sequence, in a case where the power conversion unit has no idle power, a corresponding module assembly of a charging terminal corresponding to the to-be-charged vehicle is used to charge the to-be-charged vehicle; and during charging, in a case where charging power allocated to the to-be-charged vehicle includes redundant power and the redundant power is an integer multiple of power of one of the plurality of rectification modules, rectification modules having the redundant integer multiple of power are cut off one by one, the cut rectification modules are configured to enter a sequence of charging modules having idle power, and cut rectification modules are allocated, according to a first-in first-out principle, to charging terminals that need to charge vehicles and exclude charging terminals of the cut rectification modules so as to charge the vehicles that need to be charged.

2. The charging station of claim 1, wherein each of the at least one charging terminal comprises a charging column connected to one of the at least one power conversion unit, a charging cable connected to the charging column, and a vehicle plug connected to the charging cable;

the charging column is provided with a charging controller, and the charging controller is configured to communicate with the one of the at least one power conversion unit and a battery management system of a vehicle respectively;

the charging controller is provided with an active safety protection module, the active safety protection module is configured to monitor a power storage battery of the vehicle and a charging terminal, and take an active safety protection measure in a case where the power storage battery of the vehicle and the charging terminal satisfy an active safety protection condition during charging;

the active safety protection condition comprises the following:

a voltage of a single power storage battery is greater than a maximum allowable charging voltage threshold of the single power storage battery, a temperature of the power storage battery is greater than a maximum allowable temperature threshold of the power storage battery, a voltage output value of the charging terminal is greater than a maximum allowable charging voltage threshold of the charging terminal, a required charging voltage value of the vehicle is greater than a maximum allowable charging voltage threshold of the vehicle, or a charging voltage measurement value of the power storage battery is greater than a maximum allowable charging voltage threshold of the power storage battery, a current output value of the charging terminal is greater than a maximum allowable charging current threshold of the charging terminal, a required charging current value of the vehicle is greater than a maximum allowable charging current threshold of the vehicle, or a charging current measurement value of the power storage battery is greater than a maximum allowable charging current threshold of the power storage battery, an accumulated charging electric quantity of the charging terminal is greater than a total electric quantity indicated for the power storage battery, an absolute value of a difference between the charging voltage measurement value of the power storage battery and the voltage output value of the charging terminal is greater than a preset voltage threshold, an absolute value of a difference between the charging current measurement value of the power storage battery and the current output value of the charging terminal is greater than a preset current threshold, or a current state of charge (SOC) of the power storage battery remains unchanged within 5 min, and an estimated remaining charging time remains unchanged within 5 min; and the active safety protection measure comprises stopping charging within 1 s, disconnecting a low-voltage auxiliary power supply relay and a high-voltage direct-current contactor on a direct-current output circuit bus, and uploading alarm information.

3. The charging station of claim 1, wherein the alternating-current power distribution module comprises a circuit breaker, a contactor and a lightning protector; and a leakage protection switch is disposed at an output feed terminal and a direct-current fast-acting fuse is disposed at a charging connection output terminal to provide an overload and short-circuit protection.

4. The charging station of claim 1, wherein each of the at least one power conversion unit is provided with an input overvoltage or undervoltage protection module, and the input overvoltage or undervoltage protection module is configured to control respective rectification modules to shut down and raise an alarm in a case of an input overvoltage or undervoltage protection action; and each of the at least one power conversion unit is provided with an output overvoltage or overcurrent protection module, and the output overvoltage or overcurrent protection module is configured to control respective rectification modules to shut down and raise an alarm in a case of an output overvoltage or overcurrent protection action.

5. The charging station of claim 2, wherein the charging controller is configured to control a charger to stop charging and control the low-voltage auxiliary power supply relay and the high-voltage direct-current contactor on the direct-current output circuit bus to be disconnected within 100 ms when one of the following cases occurs during charging:

a failure that the charger is incapable of continuing charging;

triggering an emergency stop switch action;

disconnecting a protective ground wire between the charger and the vehicle; or disconnecting a connection confirmation signal between the charger and the vehicle.

6. The charging station of claim 2, wherein the vehicle plug is provided with an electronic lock and a mechanical lock which are locked to a vehicle charging interface; in a case where the electronic lock is in a locked position, the mechanical lock is inoperable and the charging controller is configured to determine whether the electronic lock is reliably locked, and a charger stops charging or does not start charging in a case where the electronic lock is not reliably locked; and the electronic lock is automatically unlocked in a case where the charger is faulty and incapable of continuing charging.

7. The charging station of claim 2, wherein each of the at least one charger comprises a vehicle and charger matching predetermination module, wherein the vehicle and charger matching predetermination module is configured to: in a case where a charging controller in a respective charger detects that a vehicle-end battery voltage is normal after a vehicle-end direct-current contactor is closed in a stage where the vehicle is ready for starting charging, determine that the vehicle matches the respective charger and allow a charging process to be started; and each of the at least one charger further comprises a precharging control module configured to: after a respective charger detects the vehicle-end battery voltage and determines that the vehicle matches the respective charger in a stage where the vehicle is ready for starting charging, perform precharging control, adjust an output voltage of the respective charger such that a difference between the output voltage of the respective charger and a vehicle-end battery voltage measurement value is less than 10 V, close a direct-current contactor of the respective charger, and control a surge current flowing, which is from the vehicle to the respective charger or from the respective charger to the vehicle and is generated when the direct-current contactor of the respective charger is turned on, to be less than 20 A.

8. The charging station of claim 2, wherein the charging controller is provided with a bleeding control module, the bleeding control module is communicatively connected to a bleeder circuit, the bleeder circuit is disposed at an output terminal of a respective rectification module, and the bleeding control module is configured to: after normal charging is finished or abnormal charging is discontinued and a direct-current contactor of the respective charger is turned off, control the bleeder circuit to bleed a residual voltage at the output terminal of the respective rectification module and reduce a direct-current output voltage of the respective rectification module to a voltage of less than 60 V within 1 s; and the each of the at least one charger comprises a direct-current contactor state monitoring module; the direct-current contactor state monitoring module is configured to determine whether each closing and disconnection action state of a high-voltage direct-current contactor of the switch matrix is consistent with a control command of the charging controller, and terminate a charging process in a case where each closing and disconnection action state of the high-voltage direct-current contactor of the switch matrix is inconsistent with the control command of the charging controller; and the direct-current contactor state monitoring module is configured to perform a contact adhesion detection of the high-voltage direct-current contactor of the switch matrix each time the high-voltage direct-current contactor of the switch matrix is turned off, and control the charger to raise an alarm and stop charging in a case where the high-voltage direct-current contactor of the switch matrix undergoes contact adhesion.

9. The charging station of claim 1, wherein each of the at least one power conversion unit further comprises a temperature and humidity adjustment module, and the temperature and humidity adjustment module is configured to monitor temperature and humidity in a cabinet of a respective power conversion unit and automatically adjust the temperature and the humidity in the cabinet of the respective power conversion unit so as to make the temperature and the humidity in the cabinet of the respective power conversion unit within a set range; and each of the at least one power conversion unit further comprises a water immersion protection module, and the water immersion protection module is configured to automatically disconnect an alternating-current input power supply and send a warning signal in a case where a water level in the cabinet of the respective power conversion unit reaches a preset height.

* * * * *